United States Patent
Hara et al.

(10) Patent No.: US 7,113,395 B2
(45) Date of Patent: Sep. 26, 2006

(54) INFORMATION PROCESSING APPARATUS INSTALLABLE IN DOCKING STATION OF CAR

(75) Inventors: Yasushi Hara, Kawasaki (JP); Hideki Tanaka, Kawasaki (JP); Hideyuki Motoyama, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/073,576

(22) Filed: Mar. 8, 2005

(65) Prior Publication Data

US 2005/0146847 A1 Jul. 7, 2005

Related U.S. Application Data

(63) Continuation of application No. PCT/JP03/05556, filed on Apr. 30, 2003.

(51) Int. Cl.
*G06F 1/16* (2006.01)
*H05K 5/00* (2006.01)

(52) U.S. Cl. .................. 361/681; 455/501; 307/18; 341/687

(58) Field of Classification Search .............. 455/501, 455/425, 564, 557; 307/10.1, 18; 341/22; 361/679–687, 724–727; 439/131
See application file for complete search history.

(56) References Cited

U.S. PATENT DOCUMENTS 5,555,491 A * 9/1996 Tao .............................. 361/686

2002/0070883 A1 * 6/2002 Dosch ........................ 341/22
2005/0047081 A1 * 3/2005 LaPorte et al. ............. 361/686

FOREIGN PATENT DOCUMENTS

| JP | 5-23226 | 3/1993 |
| JP | 6-250156 | 9/1994 |
| JP | 10-71037 | 3/1998 |
| JP | 2000-311029 | 11/2000 |
| JP | 2001-169166 | 6/2001 |
| JP | 2001-268613 | 9/2001 |
| JP | 2002-91619 | 3/2002 |
| JP | 2002-132382 | 5/2002 |
| JP | 2003-44166 | 2/2003 |

* cited by examiner

*Primary Examiner*—Hung Van Duong
(74) *Attorney, Agent, or Firm*—Staas & Halsey LLP

(57) ABSTRACT

An information processing apparatus (100) includes a main unit (110) including a keyboard and having a generally rectangular major surface, and includes a display device (130) including a display screen and having a generally rectangular major surface. A bottom of the major surface of the display device can be selectively placed in a first position in which the bottom extends substantially along a first side of the major surface of the main unit, and a second position in which the bottom extends substantially along a second side of the major surface of the main unit that is substantially perpendicular to the first side. The information processing apparatus (100) further comprises power supply and information communications connectors in the main unit on a third side of the major surface of the main unit that is opposite and substantially parallel to the second side. The connector is connectable through another connector on a car docking station.

23 Claims, 11 Drawing Sheets

INFORMATION PROCESSING APPARATUS INSTALLABLE IN DOCKING STATION OF CAR

This application is a continuing application, filed under 35 U.S.C. §111(a), of International Application PCT/JP03/05556, filed Apr. 30, 2003.

FIELD OF THE INVENTION

The present invention relates generally to an arrangement of an information processing apparatus installable at a docking station of a motor vehicle, and more particularly to a mobile personal computer which can be put in a narrow cavity in a car console box.

BACKGROUND OF THE INVENTION

A conventional car navigation system apparatus is fixedly mounted on a car and cannot be taken out of the car. The car navigation system detects the current position of a car based on data from a GPS receiver, azimuth data from a gyro sensor, VICS (Vehicle Information and Communication System) information, and car speed information. Removable car navigation system apparatuses have been developed, which make it possible for a family to make plans for drive. Such a removable car navigation system detects the position based on data from a GPS receiver and azimuth data from a gyro sensor, without using VICS information or car speed information, and hence the position detecting precision is low.

Currently available car navigation systems have functions, such as electronic mail transmission and reception and schedule management. Their functions are almost like those of notebook personal computers (PCs). Accordingly, if a car on which such a car navigation system is fixedly installed is stolen, there is a risk that private information stored in the car navigation system may be leaked out. Accordingly, there is a need for a mobile PC which can be installed on a car and removed from the car, and has functions as a car navigation system and an ordinary notebook PC.

In Japanese Patent Application Publication JP 2000-311029 A published on Nov. 7, 2000, Ishii discloses a handheld PC having a display rotatable by 270 degrees or more relative to a main unit, and having a docking connector on a surface of the PC which, in the normal use, is a front surface, and having terminals for various uses on the rear surface. The handheld PC has a navigation software installed therein and is used as a navigation apparatus by itself outside the car. When used in the car, it is inserted into a handheld PC inserting slot of an on-board apparatus docking station with the front side of the main unit facing ahead to thereby connect the docking connector to the docking terminal within the slot. The PC takes in vehicle-speed-representative pulses from the docking station to navigate with precision.

In the handheld PC disclosed in Japanese Patent Application Publication No. JP 2000-311029 A above, however, the keyboard of this PC faces downward in the docking station, and hence heat generated in the PC may not be dissipated efficiently.

In Japanese Patent Application Publication JP H 06-250156 A published on Sep. 9, 1994, Shimada discloses a LCD horizontally rotatable relative to a PC main unit. Hence a rotation axis is located at the rear center of the PC main unit.

Also, in Japanese Patent Application Publication JP 2001-169166 A published on Jun. 22, 2001, Shibata et al. disclose a monitor which can be laterally rotated relative to a main unit of a portable terminal. Hence a rotation axis is located at the rear center of the main unit.

Usually, car audio apparatuses and car navigation apparatuses have an approximate size of one DIN (i.e. width of 178 mm and height of 50 mm), or two DINS (i.e. width of 178 mm and height of 100 mm). A handheld PC with a full-keyboard comparable to such sizes has a very small key pitch, and hence is difficult to operate. The width of a keyboard easy to operate is typically about 230 mm at the minimum.

Display devices having a size equal to or less than one DIN is a 7-inch or smaller display (having a display area of $154.1 \times 87.0$ mm$^2$ and external dimensions of $170.0$ mm$\times 104.0$ mm$\times 18.0$ mm). Ordinary mobile notebook PCs have a screen size of 9 inches or 10.4 inches. Accordingly, notebook PCs having a 7-inch display device may be too small for practical use.

The inventors of this application has recognized the need for a PC having a limited predetermined width and still having a size for enabling an operator to operate it easily.

Accordingly, an object of the present invention is to provide a mobile information processing apparatus having a predetermined, limited width and a size sufficient for enabling an operator to operate it easily.

Another object of the present invention is to provide an information processing apparatus having a display device that can assume different positions relative to a main unit of the information processing apparatus.

SUMMARY OF THE INVENTION

In accordance with an aspect of the present invention includes a main unit including a keyboard and having a generally rectangular major surface, and includes a display device including a display screen and having a generally rectangular major surface. A bottom of the major surface of the display device can be selectively placed in a first position in which the bottom extends substantially along a first side of the major surface of the main unit, and a second position in which the bottom extends substantially along a second side of the major surface of the main unit that is substantially perpendicular to the first side. The information processing apparatus further comprises power supply and information communications connectors in the main unit on a third side of the major surface of the main unit that is opposite and substantially parallel to the second side. The connector is connectable through another connector on a motor vehicle docking station.

In accordance with an embodiment of the invention, the bottom of the display device is mounted substantially at its one end to a portion of the main unit substantially at a corner thereof in such a manner as to be rotatable substantially in parallel with the major surface of the display device.

In accordance with another embodiment of the invention, a substantially center portion of the bottom of the display device can be removably mounted to a substantially center portion of the first side of the major surface of the main unit, and that the substantially center portion of the bottom of the display device can be removably mounted to a portion of the second side of the major surface of the main unit.

According to the invention, a mobile information processing apparatus has a predetermined, limited width and a size sufficient for enabling an operator to operate it easily.

Throughout the drawings, similar symbols and numerals indicate similar items and functions.

DESCRIPTION OF THE PREFERRED EMBODIMENTS

Figure 1A:
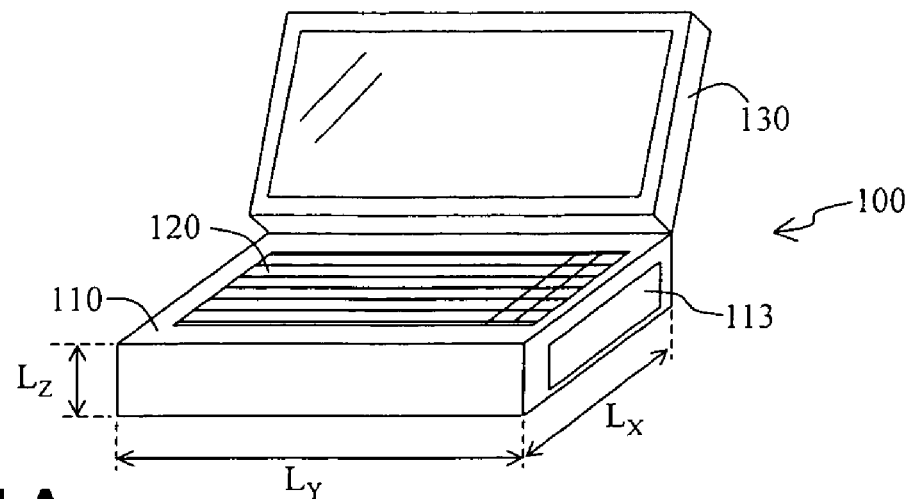
FIGS. 1A, 1B and 1C are perspective views of notebook personal computers (PCs) as mobile information processing apparatuses in accordance with an embodiment of the present invention.
Figure 1B:
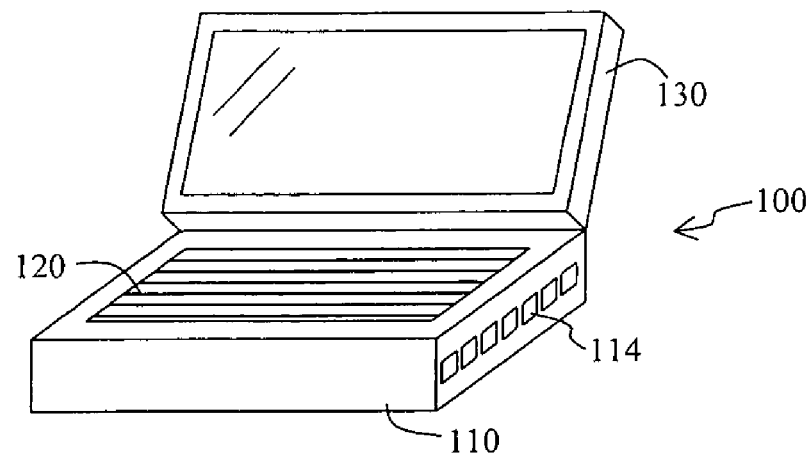
Figure 1C:
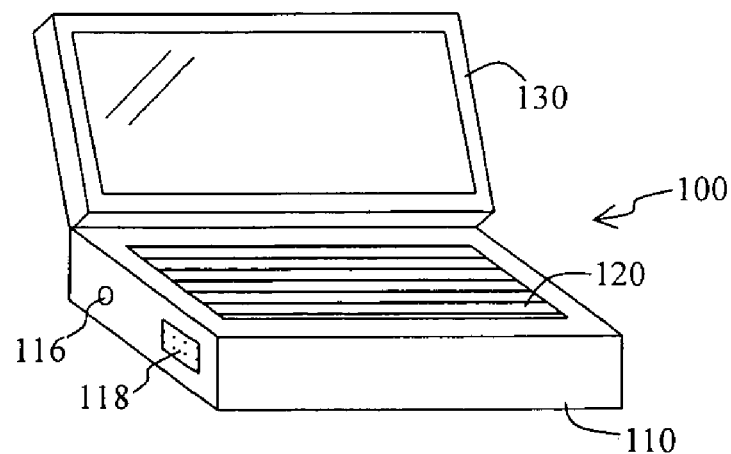

FIGS. 1A, 1B and 1C are perspective views of notebook personal computers (PCs) 100 as mobile information processing apparatuses in accordance with an embodiment of the present invention.

The PCs 100 can function not only as a common PC but also as a vehicle or car navigation system when used at home and mounted to a car docking station.

Each of the PCs 100 shown in FIGS. 1A, 1B and 1C includes a main unit 110 having a keyboard 120, and a display device 130, which typically is a liquid crystal display device. The left and right lateral sides of the PC 100 have dimensions equal to or less than one DIN (i.e. a width or depth $L_X$ of 178 mm and a height $L_Z$ of 50 mm), or two DINS (i.e. a width $L_X$ of 178 mm and a height $L_Z$ of 100 mm). The lateral length $L_Y$ of the PC main unit 110 is determined so as to secure the key pitch sufficient for keyboard operation, and typically is about 230 mm or larger.

In FIG. 1A, although not shown, a DVD/CD-ROM drive, a slot for a PC card or the like and/or a USB connector are mounted in a known manner in the PC main unit 110 behind a lid 113 on the right lateral side. One or two rightmost columns of keys on the keyboard 120 may be used for the vehicle navigation system.

FIG. 1B is a modification of FIG. 1A. In FIG. 1B, a plurality of keys 114 for the vehicle navigation system are disposed on the right lateral side of the PC main unit 110.

In FIG. 1C, a power receiving terminal device 116 connectable to a power supply terminal device of a docking station (not shown) on a car, and a communication connector device 118 connectable to a communication connector device of the docking station (not shown) are disposed on the left lateral side of the PC main unit 110.

Figure 2A:
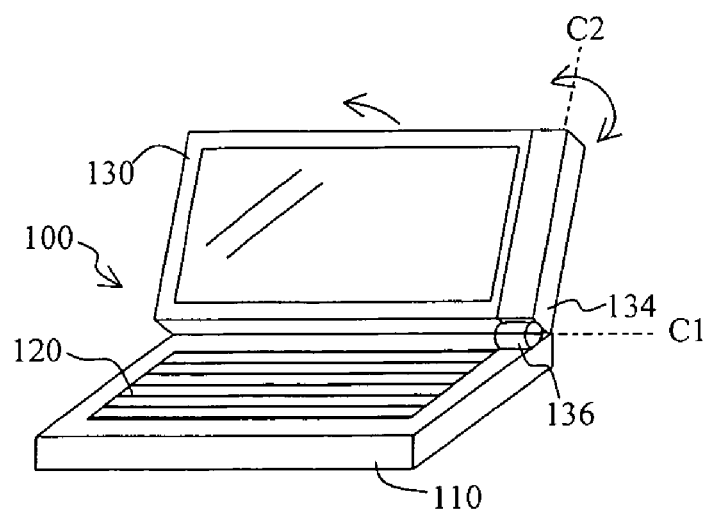
FIGS. 2A and 2B show an arrangement of the PC in accordance with an embodiment of the present invention.
Figure 2B:
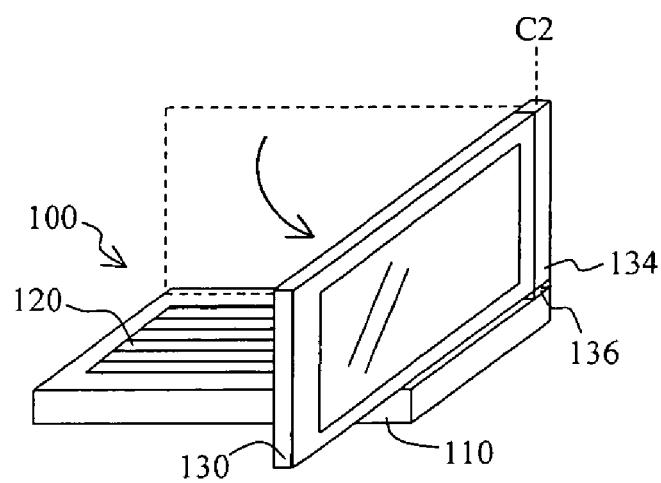
Figure 2C:
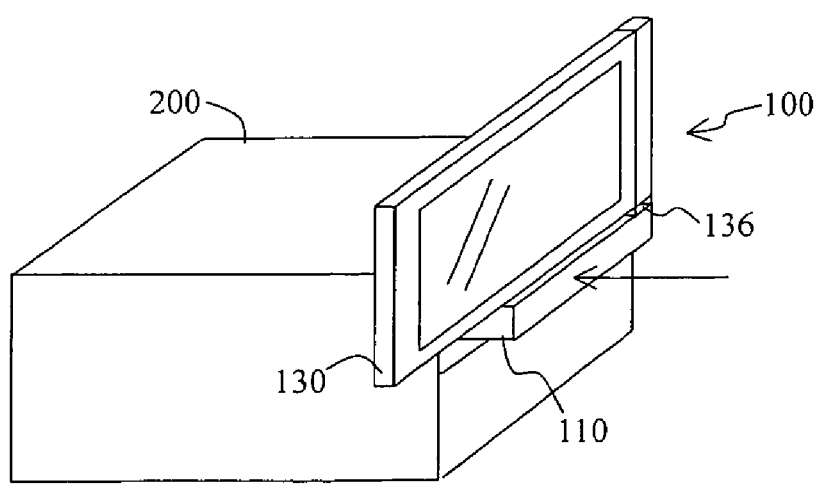
FIG. 2C shows the position of the PC after it is mounted on a docking station on a car.

FIGS. 2A and 2B show an arrangement of the PC 100 in accordance with an embodiment of the present invention. FIG. 2C shows the position of the PC 100 after it is mounted on a docking station on a car.

In FIGS. 2A and 2B, the display device 130 is attached at its bottom side portion to the PC main unit 110 along the rear upper side of the PC main unit 110 in a hinged manner. More specifically, the display device 130 is attached at the right side portion of the bottom thereof to the PC main unit 110 at the rear upper right corner thereof by means of a hinge member 136 in such a manner as to be pivotally rotatable about an axis C1 extending in parallel with the rear upper side of the upper surface of the PC main unit 110, as will be described in detail later. The display device 130 can be moved by a user to a desired angular position within a 180 degree range relative to the PC main unit 110 and is held in that position by the hinge member 136.

As will be described in detail later, the display device 130 has a hinge member 134 mounted to it along its right side and is pivotally rotatable about an axis C2 extending in parallel with the right side of the display device 130. The bottom portion of the hinge member 134 is mounted to the upper portion of the hinge member 136.

FIG. 2B shows the position of the PC 100 ready to be mounted to a docking station 200 of a car. The display device 130 opened to a position perpendicular to the main unit 110 is rotated by +90 degrees about the axis C2 toward the right side of the main unit 110.

FIG. 2C shows the PC 100 in the state shown in FIG. 2B mounted to the docking station 200 by inserting it into a housing cavity in the car docking station 200. Although the PC 100 has a front lateral length $L_Y$ sufficiently large for keyboard operation, it can be mounted in the docking station 200 having a restricted narrow opening by horizontally rotating the display device 130 by 90 degrees as shown.

Figure 3A:
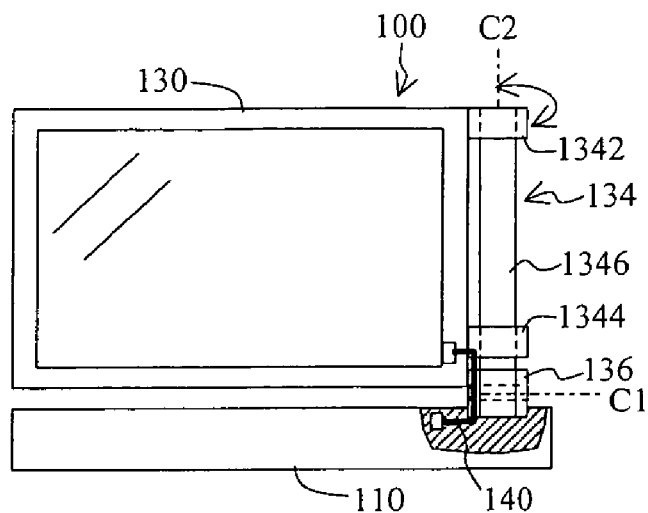
FIGS. 3A and 3B are front and right side views showing how the display device is mounted to the PC main unit.
Figure 3B:
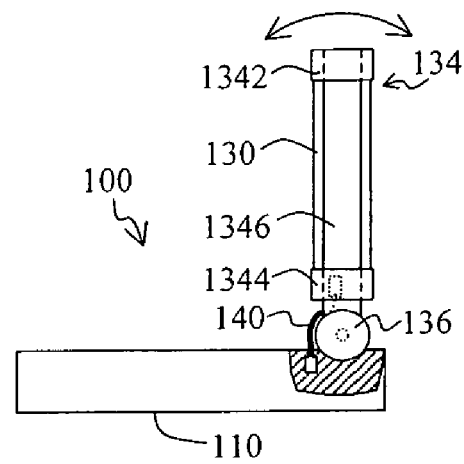

FIGS. 3A and 3B are front and right side views showing how the display device 130 is mounted to the PC main unit 110. Annular members or rings 1342 and 1344 are secured respectively to the upper and lower ends of the right lateral side of the display device 130 in such a manner as to be concentric with the axis C2 extending in parallel with the right side of the display device 130. With these annular members 1342 and 1344, the display device 130 is mounted on a columnar shaft 1346 disposed coaxial with the axis C2 in such a manner as to be pivotally rotatable.

The lower end of the shaft 1346 is secured to an upper portion of the outer periphery of the hinge member 136 in such a manner as to pivotally rotatable about the horizontal axis C1. A portion of the bottom side of the outer periphery of the hinge member 136 is secured to the corner of the upper surface of the PC main unit 110. The PC main unit 110 and the display device 130 are electrically connected to each other by means of a power supply and VGA cable bundle 140.

Figure 3C:
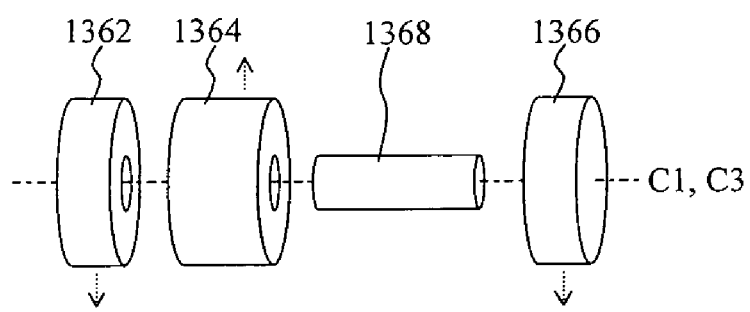
FIG. 3C shows the hinge member shown in FIGS. 3A and 3B in a more specific form.

FIG. 3C shows the hinge member 136 shown in FIGS. 3A and 3B in a more specific form. The hinge member 136 includes left and right columnar members 1362 and 1366 having recesses, respectively, an intermediate annular member (ring) 1364, and a shaft 1368. The shaft 1368 is inserted through a bore in the annular member 1364 in such a manner as to be rotatable therein, and has its opposite ends inserted into and secured to the recesses in the columnar members 1362 and 1366. The bottom portions of the outer peripheries of the annular members 1362 and 1366 are secured to the corner of the upper surface of the PC main unit 110. The top portion of the outer periphery of the annular member 1364 is secured to the lower end of the shaft 1346.

Figure 4A:
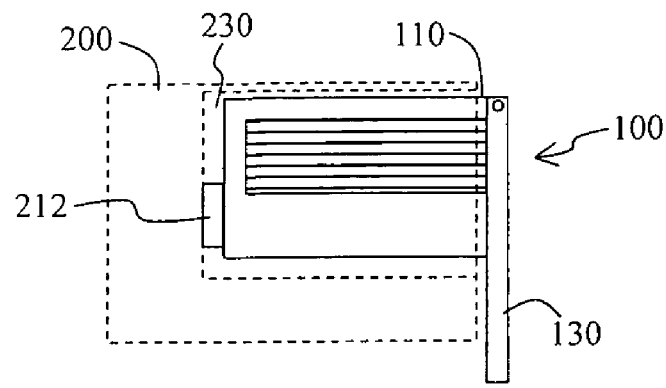
FIGS. 4A and 4B show are top plan views of the PC, in accordance with the embodiment shown in FIGS. 2A–2C, when it is put into the cavity of the docking station.
Figure 4B:
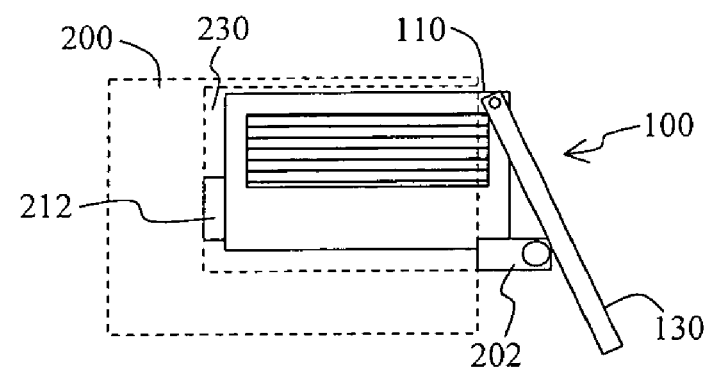

FIGS. 4A and 4B are top plan views of the PC 100, in accordance with the embodiment shown in FIGS. 2A–2C, when it is put into the cavity 230 of the docking station 200. In these figures, the external form of the housing of the docking station 200 and the shape of the cavity are shown by broken lines.

In FIG. 4A, the left lateral side of the PC main unit 110 of the PC 100 is electrically connected to the outward-facing innermost (left) surface of the cavity 230 in the docking station 200 via the power supply and information communications connector 212. In FIG. 4B, the display device 130 of the PC 100 is rotated rightward to some extent and fixed at the tilted angle by a stop member 202. This arrangement is suitable for a car with right-hand drive.

Figure 5A:
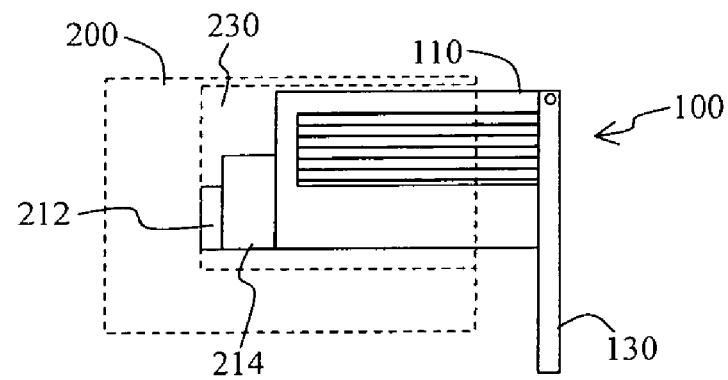
FIGS. 5A and 5B are top plan views of the PC, in accordance with the embodiment shown in FIGS. 2A–2C, when it is put in the cavity in the docking station in a different manner.
Figure 5B:
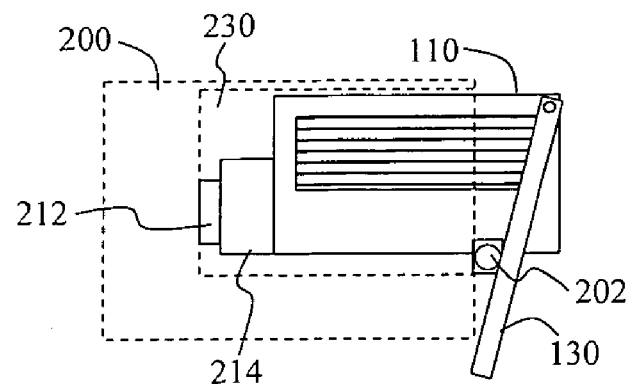

FIGS. 5A and 5B are top plan views of the PC 100, in accordance with the embodiment shown in FIGS. 2A–2C, when it is put in the cavity 230 in the docking station 200 in a different manner.

In FIG. 5A, the left lateral side of the PC 100 is electrically connected to the forward-facing innermost surface of the cavity 230 in the docking station 200 by means of power supply and information communications connectors 212 and 214. In FIG. 5A, the hinge member 134 or the right lateral side is arranged to somewhat protrude from the opening in the docking station 200 toward a driver (or rightward). In FIG. 5B, the display device 130 of the PC 100 is rotated leftward to some extent and fixed at the tilted angle by the stop member 202. This arrangement is suitable for a car with left-hand drive.

Figure 6A:
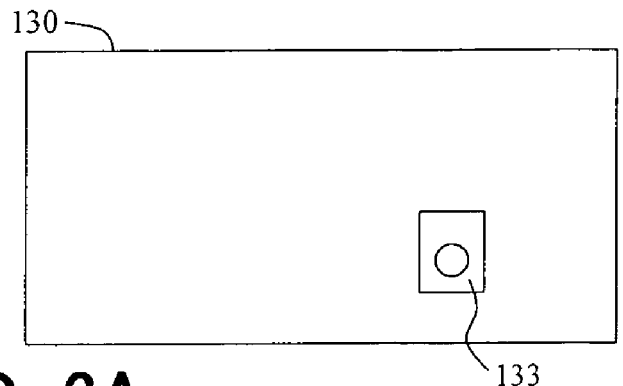
FIGS. 6A and 6B are rear and left side views of the display device.
Figure 6B:
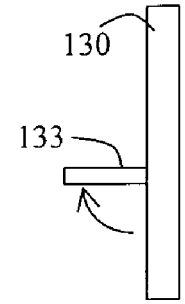

FIGS. 6A and 6B are rear and left side views of the display device 130, respectively. In FIG. 6A, the display device 130 has a retractable plate 133 having its upper side hinged to a center portion of the rear surface of the display device 130. The plate 133 has an opening therein. In FIG. 6B, the plate 133 is lifted upward to rotate about its upper edge in order to mount the PC 100 on the docking station 200.

Figure 6C:
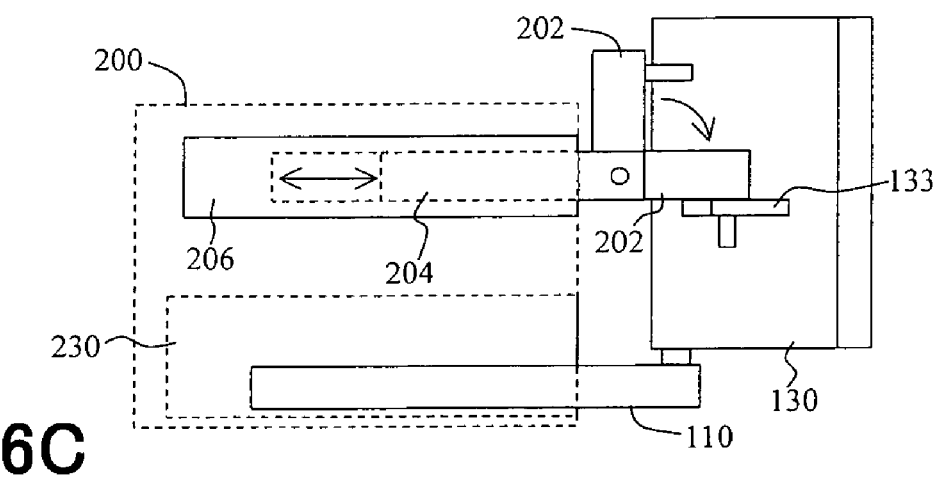
FIGS. 6C and 6D show a pin on the stop member attached to the docking station inserted into the opening in the plate.
Figure 6D:
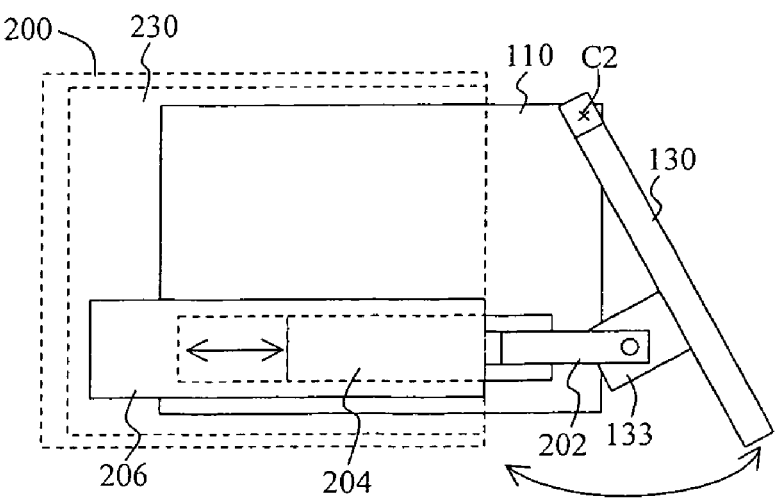

FIGS. 6C and 6D show a pin on the stop member 202 attached to the docking station 200 inserted into the opening in the plate 133. The stop member 202 is attached to an arm 204 in a hinged manner. The arm 204 is horizontally slidable to and fro in a recess formed in a case 206 attached to the inner ceiling of the docking station 200, and the rear end of the arm 204 is held in a position within a predetermined range in the recess.

Figure 7A:
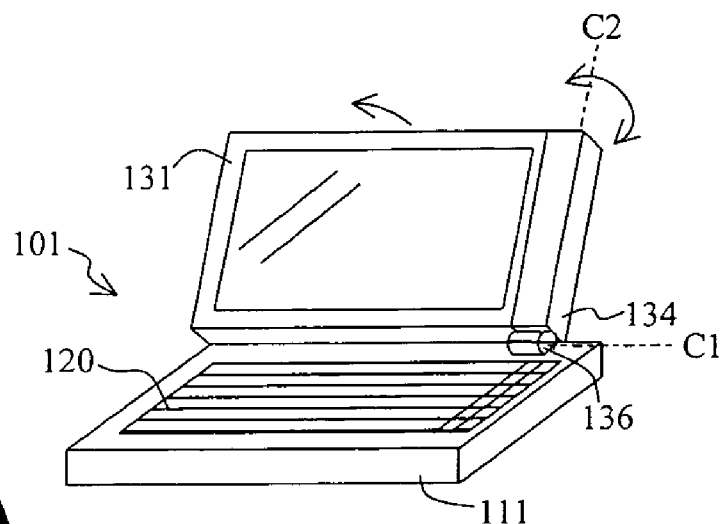
FIGS. 7A and 7B show a PC in accordance with another embodiment of the invention.
Figure 7B:
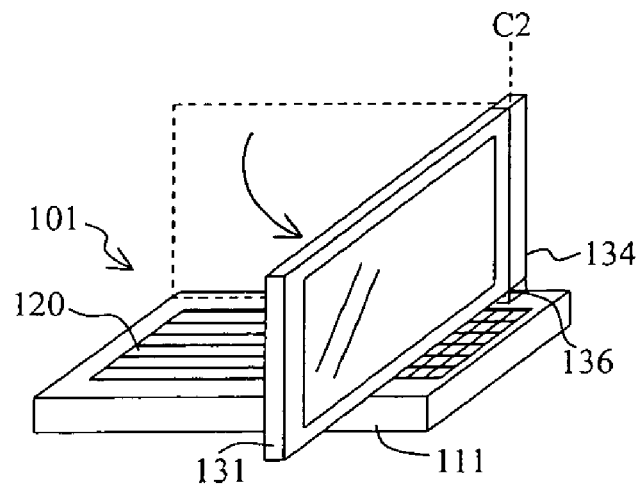
Figure 7C:
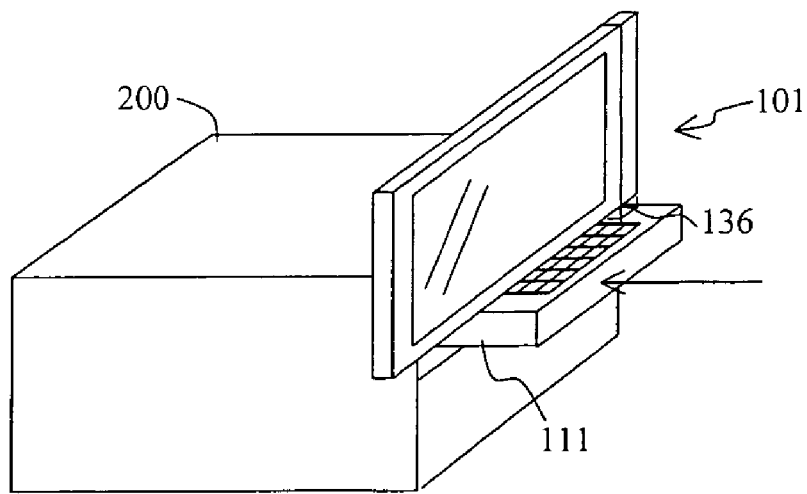
FIG. 7C is the arrangement of the PC mounted on the car docking station.

FIGS. 7A and 7B show a PC 101 in accordance with another embodiment of the invention. FIG. 7C is the arrangement of the PC 101 mounted on the car docking station 200. In comparison with the PC 100 shown in FIGS. 2A and 2B, the right side portion of a display device 131 shown in FIGS. 7A and 7B is mounted to the upper surface of a PC main unit 111, by means of the hinge 136, at a location shifted leftward from the right rear corner by a distance corresponding substantially to rightmost several columns of keys on the keyboard 120 in such a manner as to be pivotally rotatable about the axis C1 extending in parallel with the rear upper edge of the main unit 111. In this case, one or two rightmost columns of keys on the keyboard 120 can be for use in a vehicle navigation system, for example. Thus, the bottom side of the display screen of the display device 131 can be selectively placed in a position where it is substantially in parallel with the rear side of the major surface of the PC main unit 111, and in a different position near the right side of the major surface approximately perpendicular to the rear side of the major surface of the PC main unit 111 in which position it extends substantially in parallel with the right side of the major surface of the PC main unit 111. Otherwise, the PC 101 has a similar configuration to the PC 100 shown in FIGS. 2A and 2B.

Figure 8:
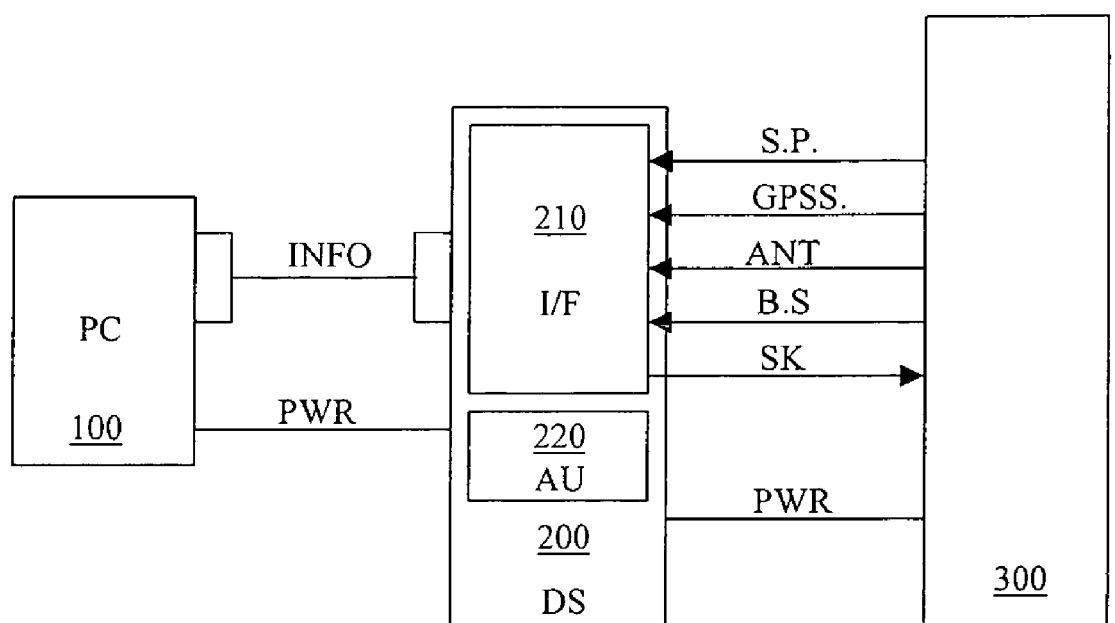
FIG. 8 shows electrical connections when the PC is mounted on the docking station.

FIG. 8 shows electrical connections when the PC 100 is mounted on the docking station 200. In FIG. 8, the PC 100 is coupled via an information line INFO and a power supply line PWR to an interface circuit 210 and an audio apparatus 220 in the docking station 200. The interface circuit 210 and the audio apparatus 220 are coupled to a car console 300 via a line S.P. for car speed representative pulses, a GPS sensor signal line GPSS., a diversity antenna line ANT, a beacon sensor signal line B.S., a loudspeaker line SK, and a power line PWR.

Figure 9A:
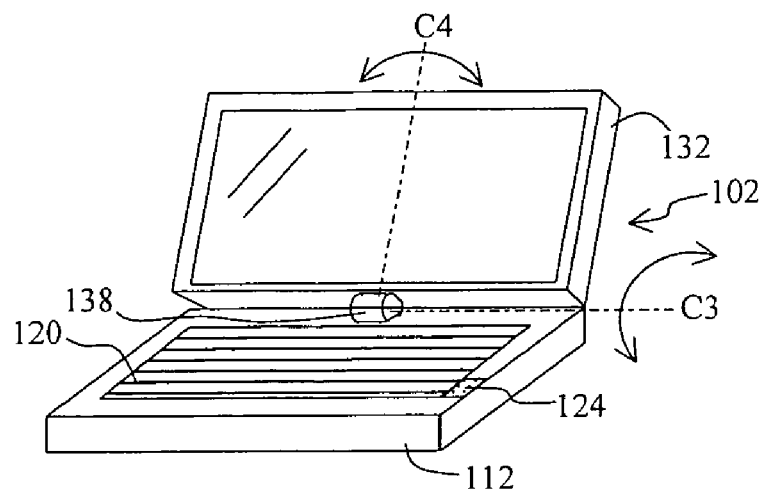
FIGS. 9A and 9B show an arrangement of a PC in accordance with another embodiment of the invention.
Figure 9B:
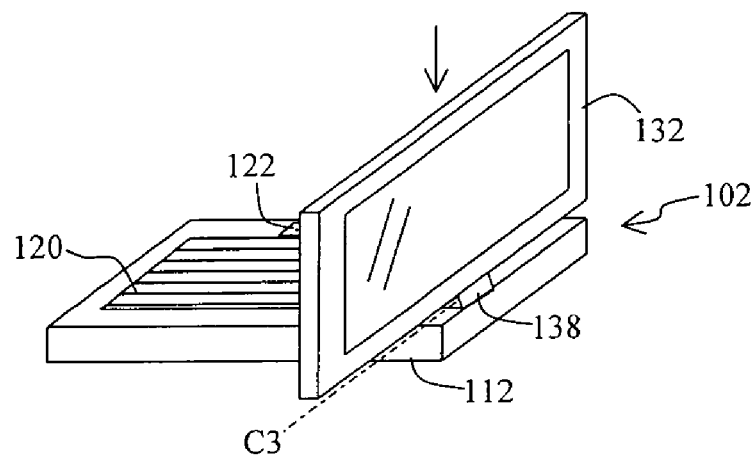
Figure 9C:
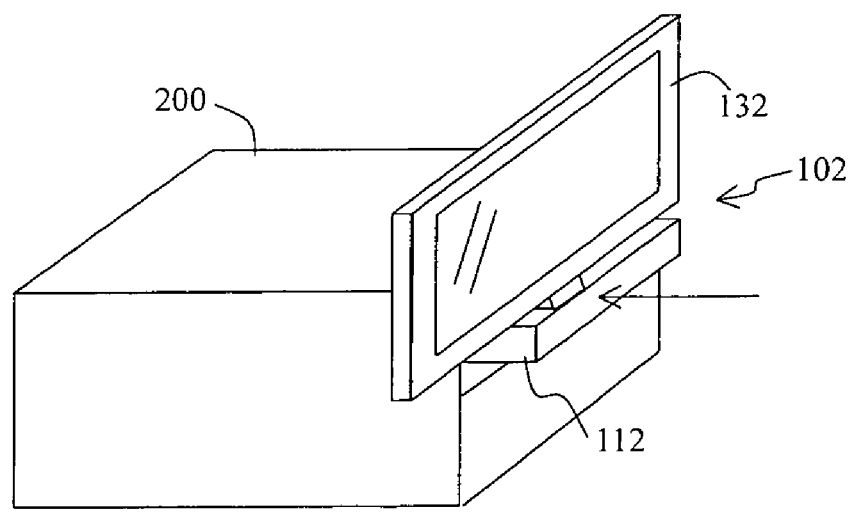
FIG. 9C shows an arrangement of the PC mounted on the car docking station.

FIGS. 9A and 9B show an arrangement of a PC 102 in accordance with another embodiment of the invention. FIG. 9C shows an arrangement of the PC 102 mounted on the car docking station 200. In FIGS. 9A and 9B, a hinge member 138 attached to a display device 132 is used in place of the hinge members 134 and 136 of FIGS. 2A and 2B. The display device 132 can be placed in two positions 122 and 124 in a PC main unit 112 shown in FIGS. 9A and 9B. Otherwise, the PC 102 has a similar configuration to the PC 100 shown in FIGS. 2A and 2B.

In FIG. 9A, the display device 132 is attached at its bottom side portion to the PC main unit 112 along the rear upper edge of the PC main unit 112 in a hinged manner. More specifically, a center portion of the bottom of the display device 132 is hinged in a recess 122 formed at the rear of the center portion of the upper surface of the PC main unit 112, by means of the hinge member 138 disposed in parallel with the rear upper side of the main unit 112 in such a manner as to be pivotally rotatable about an axis C3 of the hinge member 138. The display device 132 is moved by a user to a desired angular position within a 180 degree range relative to the PC main unit 112 and held there by means of the hinge member 138.

In FIG. 9B, the display device 132 is attached at its bottom portion to the PC main unit 112 along the upper right side edge of the PC main unit 112 in a hinged manner. More specifically, the center portion of the bottom of the display device 132 is hinged in a recess 124 at a right center portion of the upper surface of the PC main unit 112 nearer to the front surface of the main unit 112, by means of the hinge member 138 in such a manner as to be pivotally rotatable about the axis C3 of the hinge member 138 disposed in parallel with the right upper side of the PC main unit 112. The display 132 is moved by a user to a desired angular position within a 180 degree range relative to the PC main unit 112 and held there by means of the hinge member 138.

Figure 10:
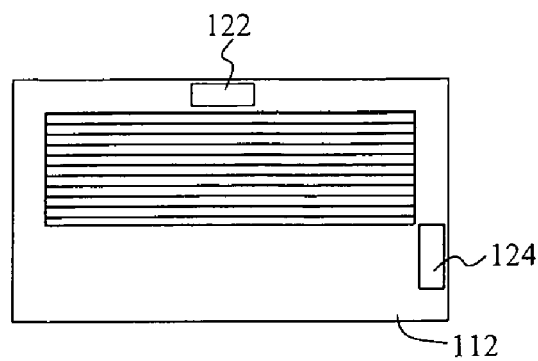
FIG. 10 shows the positions of the recesses formed in the upper surface of the PC main unit.

FIG. 10 shows the positions of the recesses 122 and 124 formed in the upper surface of the PC main unit 112. The recess 122 is formed in the rear center of the upper surface of the PC main unit 112. The recess 124 is formed in the center portion of the right side, somewhat closer to the front side, of the upper surface of the PC main unit 112.

Figure 11A:
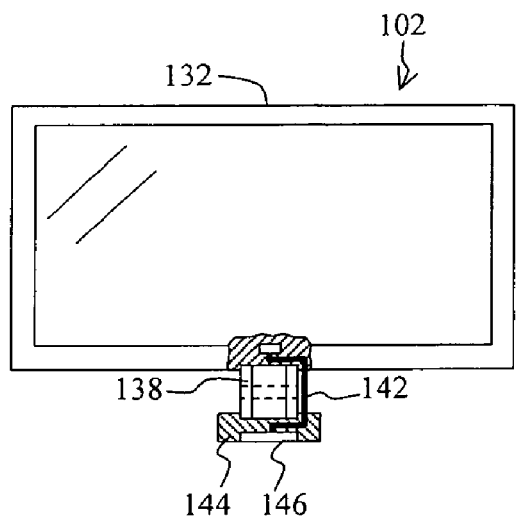
FIGS. 11A and 11B are partially cutaway front and right side views of the display device having the hinge member.
Figure 11B:
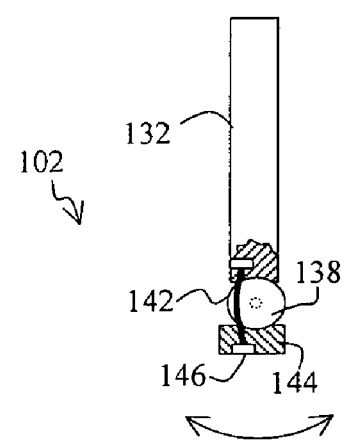

FIGS. 11A and 11B are partially cutaway front and right side views of the display device 132 having the hinge member 138. The center portion of the bottom surface of the display device 132 is secured to an upper portion of the periphery of the hinge member 138 in such a manner as to be pivotally rotatable about the horizontal axis C3 (FIGS. 9A and 9B). A portion of the bottom of the periphery of the hinge member 138 is secured to the upper surface of a mounting member 144, which can be placed into the recesses 122 and 124 in the PC main unit 112. The hinge member 138 has the same structure as the hinge member 136 shown in FIGS. 3A–3C. The mounting member 144 and the display device 132 are electrically interconnected via a power supply and VGA cable bundle 142.

Figure 12A:
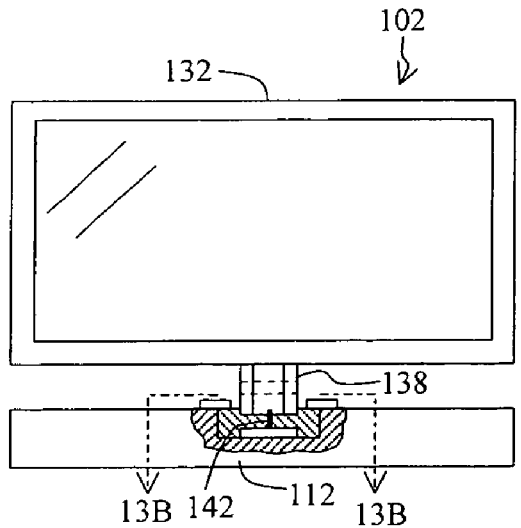
FIGS. 12A and 12B are partially cutaway front and right side views of the PC with the display device mounted on the PC main unit.
Figure 12B:
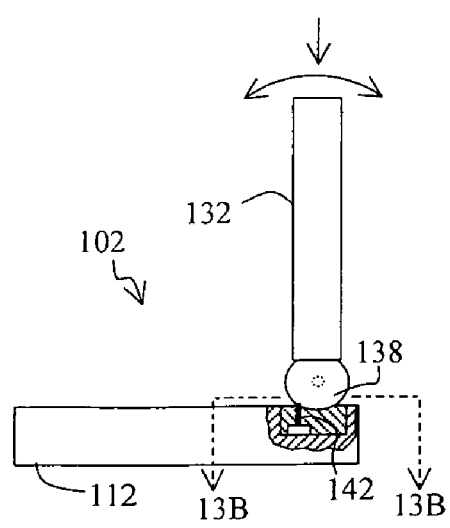
Figure 13A:
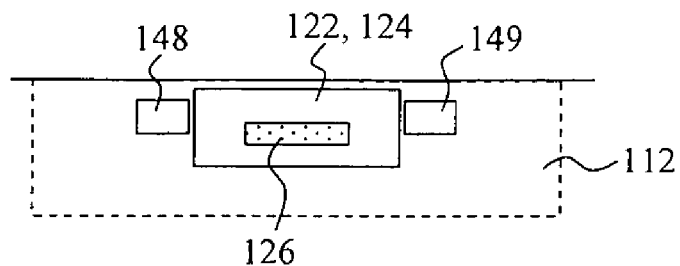
FIG. 13A is a top plan view of the recesses formed in the PC main unit.
Figure 13B:
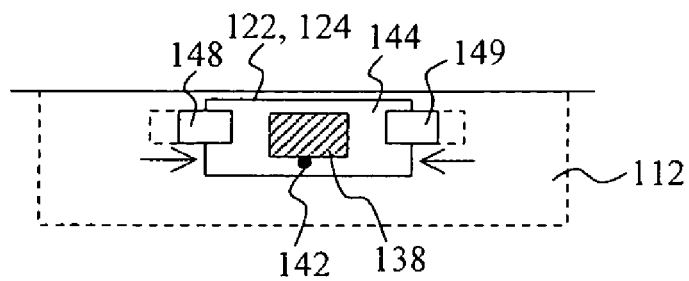
FIG. 13B is a cross-sectional view along a dot-and-dash line 13B—13B in FIGS. 12A and 12B, showing the mounting member for mounting the display device in the recesses of FIG. 13A, respectively.

FIGS. 12A and 12B are partially cutaway front and right side views of the PC 100 with the display device 132 mounted on the PC main unit 112. FIG. 13A is a top plan view of the recesses 122 and 124 formed in the PC main unit 112. FIG. 13B is a cross-sectional view along a dot-and-dash line 13B—13B in FIGS. 12A and 12B, showing the mounting member 144 for mounting the display device 132 in the recesses 122 and 124 of FIG. 13A, respectively. The mounting member 144 is inserted into the recess 122 or 124 in the PC main unit 112, which causes a connector 146 disposed in the bottom surface of the mounting member 144 to be connected to the connector 126 provided in the bottom of the recess 122 or 124. The mounting member 144 is secured in the recess 122 or 124 by means of horizontally slidable retainers 148 and 149.

Figure 14A:
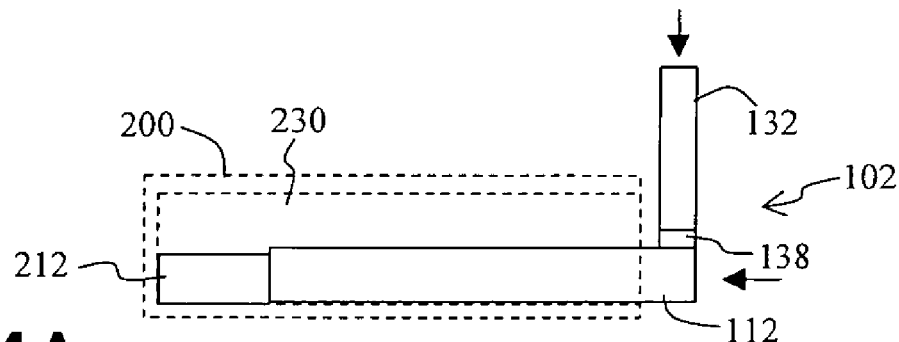
FIG. 14A is a front elevational view of the PC inserted into the cavity in the docking station shown in FIG. 9C.

FIG. 14A is a front elevational view of the PC 100 inserted into the cavity 230 in the docking station 200 shown in FIG. 9C. In FIG. 14A, the external form of the housing of the docking station 200 and the shape of the cavity are indicated by broken lines.

Figure 14B:
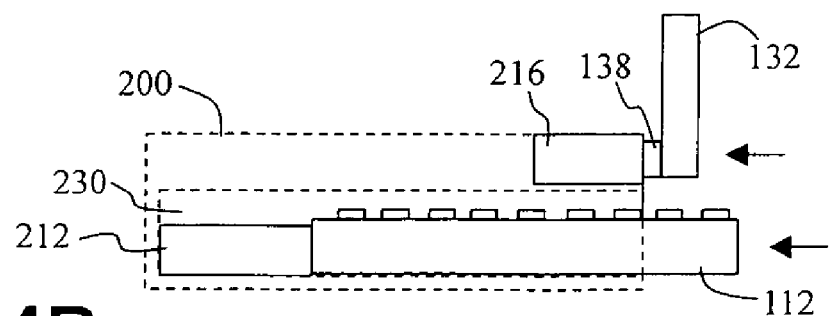
FIG. 14B shows another arrangement of the PC inserted into the cavity in the docking station

FIG. 14B shows another arrangement of the PC 102 inserted into the cavity 230 in the docking station 200. In FIG. 14B, the display device 132 is not connected to the PC main unit 112, but it is mounted in a recess 216 formed in the front, upper portion of the docking station 200. The recess 216 has the same structure as the recesses 122 and 124 and has a connector (not shown) similar to the connectors 126. The mounting member 144 for mounting the display device 132 is turned backward to the rear side of the periphery of the hinge member 138 and is inserted into the recess 216. In this case, the rightmost one or two columns of keys on the keyboard 120 of the PC main unit 112 can be used as keys for the vehicle navigation system, for example.

Figure 15:
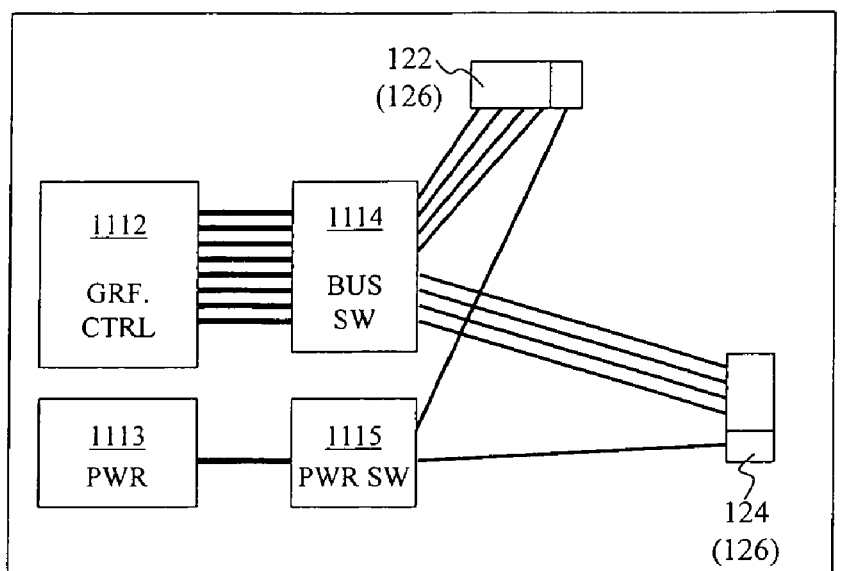
FIG. 15 shows electrical connections in the PC main unit including the connectors in the recesses.

FIG. 15 shows electrical connections in the PC main unit 112 including the connectors (126) in the recesses 122 and 124. A graphic controller 1122 is connected to the connectors (126) in the recesses 122 and 124 via a bus switching unit 1114. A power supply 1113 is connected to the connectors (126) via a power supply switching unit 1115.

FIG. 8 represents electrical connections also of the PC 102 mounted in the docking station 200 in the manner shown in FIG. 14A.

Figure 16:
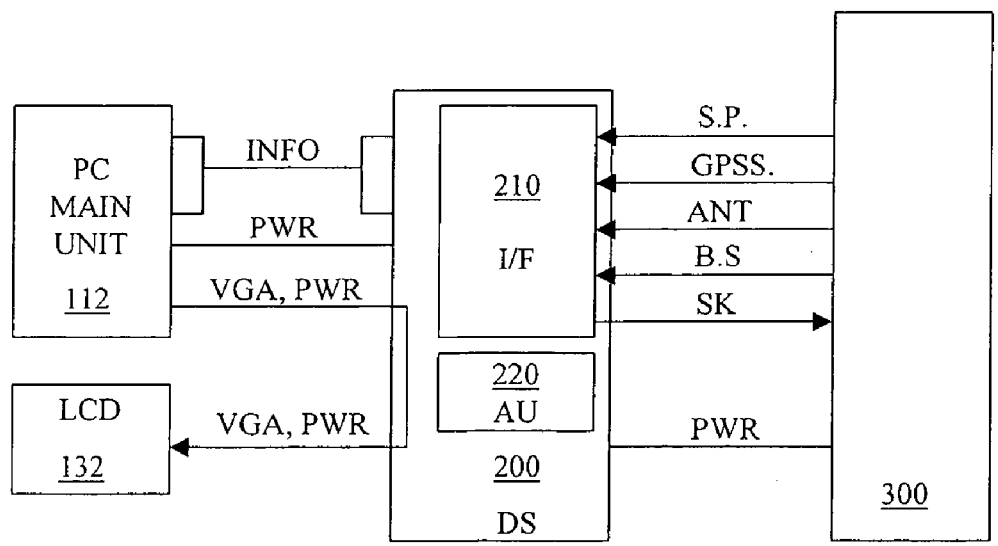
FIG. 16 is a diagram of electrical connections of the PC mounted on the docking station in the manner shown in FIG. 14B.

FIG. 16 is a diagram of electrical connections of the PC 102 mounted on the docking station 200 in the manner shown in FIG. 14B. In FIG. 16, the PC main unit 112 is coupled to the interface circuit 210 and the audio apparatus 220 via the information line INFO and the power supply line PWR. The display device 132 is coupled to the docking station 200 via the display information and power supply lines VGA, PWR and, from there further to the PC main unit 112 via similar lines VGA, PWR. The interface circuit 210 and the audio apparatus 220 are coupled to the car console 300 via the line S.P. for car speed representative pulses, the GPS sensor signal line GPSS., the diversity antenna line ANT, the beacon sensor signal line B.S., the loudspeaker line SK, and the power line PWR.

The PCs 100, 101 and 102 of the embodiments find a position based on data from a GPS receiver, azimuth data from a gyro sensor, VICS information and car speed information, and hence high precision in finding the position can be realized.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information processing apparatus, and connectable to a motor vehicle docking station, comprising:
    a main unit including a keyboard and having a generally rectangular major surface;
    a display device including a display screen and having a generally rectangular major surface; bottom of said major surface of said display device being selectively placeable in a first position in which said bottom extends substantially along a first side of said major surface of said main unit, and in a second position in which said bottom extends substantially along a second side of said major surface of said main unit that is substantially perpendicular to said first side; and
    power supply and information communications connectors in said main unit on a third side of said major surface of said main unit that is opposite, and substantially parallel, to said second side, said two connectors being connectable through other respective connectors on said motor vehicle docking station.

2. The information processing apparatus according to claim 1, wherein the bottom of said display device is mounted substantially at its one end to a portion of said main unit substantially at a corner thereof in such a manner as to be rotatable substantially in parallel with said major surface of said display device.

3. The information processing apparatus according to claim 1, wherein a substantially center portion of the bottom of said display device can be removably mounted to a substantially center portion of said first side of said major surface of said main unit, and said substantially center portion of said bottom of said display device can be removably mounted to a portion of said second side of said major surface of said main unit.

4. The information processing apparatus according to claim 1, wherein a substantially center portion of the bottom of said display device can be removably mounted to a substantially center portion of said first side of said major surface of said main unit, and that-said substantially center portion of the bottom of said display device can be removably mounted on a front surface of said motor vehicle docking station.

5. The information processing apparatus according to claim 1, further comprising:
a vehicle navigation system; and
a key on said keyboards, located nearer to said second side of said major surface of said main unit, operating the navigation system.

6. The information processing apparatus according to claim 1 wherein said second side of said major surface of said main unit has a limited length in accordance with the size of said motor vehicle docking station.

7. The information processing apparatus according to claim 2, wherein an angle of said rotation substantially in parallel with said major surface of said display device is more than 90°.

8. The information processing apparatus according to claim 2, wherein a substantially center portion of the bottom of said display device can be removably mounted to a substantially center portion of said first side of said major surface of said main unit, and said substantially center portion of said bottom of said display device can be removably mounted to a portion of said second side of said major surface of said main unit.

9. The information processing apparatus according to claim 2, further comprising:
a vehicle navigation system; and
a key on said keyboard, located nearer to said second side of said major surface of said main unit, for operating a vehicle navigation system.

10. The information processing apparatus according to claim 2, wherein said second side of said major surface of said main unit has a limited length in accordance with the size of said motor vehicle docking station.

11. The information processing apparatus according to claim 3, further comprising:
a vehicle navigation system; and
a key on said keyboard located nearer to said second side of said major surface of said main unit can be used for operating a vehicle navigation system.

12. The information processing apparatus according to claim 3, wherein said second side of said major surface of said main unit has a limited length in accordance with the size of said motor vehicle docking station.

13. The information processing apparatus according to claim 4, further comprising:
a vehicle navagation system; and
a key on said keyboard located nearer to said secand side of said major surface of said main unit, for operating a vehicle navigation system.

14. The information processing apparatus according to claim 5, wherein said second side of said major surface of said main unit has a limited length in accordance with the size of said motor vehicle docking station.

15. The information processing apparatus according to claim 5, wherein said second side of said major surface of said main unit has a limited length in accordance with the size of said motor vehicle docking station.

16. The information processing apparatus according to claim 1, wherein a substantially center portion of the bottom of said display device can be removably mounted to a substantially center portion of said first side of said major surface of said main unit, and said substantially center portion of said bottom of said display device can be removably mounted to a portion of said second side of said major surface of said main unit.

17. The information processing apparatus according to claim 7, further comprising:
a vehicle navigation system; and
key on said keyboard, located nearer to said second side of said major surface of said main unit, for operating a vehicle navigation system.

18. The information processing apparatus according to claim 7, wherein said second side of said major surface of said main unit has a limited length in accordance with the size of said motor vehicle docking station.

19. An information processing apparatus connectable to a motor vehicle docking station, comprising:
a main unit having generally rectangular, first and second opposed major surfaces with respective pairs of relatively longer and shorter parallel edges and supporting a keyboard on the first major surface;
a display device having generally rectangular, first and second opposed major surfaces and first and second pairs of parallel relatively longer and relatively shorter transverse edges and supporting a display screen on the first major surface; and
the display device being rotatably coupled to the main unit to permit rotation of the display device relatively to the main unit about a first axis, parallel to adjacent, respective longer edges of the main unit and the display device, between superposed positions of the display screen and keyboard, as a closed condition, and an upright position of the display device relatively to the main unit, as an opened condition, and to permit rotation of the display device about a second axis, intersecting and perpendicular to the first axis, relatively to the main unit.

20. The information processing apparatus according to claim 19, wherein the second axis intersects the first axis adjacent a corner formed by the commonly aligned, respective shorter and longer edges of the main unit and the display device.

21. The information processing apparatus according to claim 20, wherein, when the second axis is oriented perpendicularly to the major surface of the main unit and the first axis and the display device is in the upright position relatively to the main unit, the display device is rotatable about the second axis through an angle of at least 90°.

22. The information processing apparatus is recited in claim 21 wherein when the display unit is rotated by 90° from an aligned relationship of the display device and the main units with the respective longer edges thereof in alignment, the theretofore aligned longer edge of the display device is parallel, and contiguous, to the shorter edge of the main unit forming the corner.

23. The information processing apparatus according to claim 21, wherein:
the second axis of rotation intersects the first axis at an intermediate position along a length of the first axis and, when the display device is in the upright position relatively to the main unit, the display device, further, is rotatable about the second axis through 90° to a position transverse to the keyboard and so as to expose a portion of the keyboard of the main unit extending laterally beyond the display unit.

* * * * *

UNITED STATES PATENT AND TRADEMARK OFFICE
CERTIFICATE OF CORRECTION

PATENT NO.         : 7,113,395 B2
APPLICATION NO.    : 11/073576
DATED              : September 26, 2006
INVENTOR(S)        : Yasushi Hara et al.

It is certified that error appears in the above-identified patent and that said Letters Patent is hereby corrected as shown below:

Column 9, Line 2, change "that-said" to --said--

Column 9, Line 10, after "unit," insert --for--.

Column 9, Line 11, after "the" insert --vehicle--.

Column 9, Line 13, after "claim 1" insert --,--.

Column 9, Line 50, change "navagatlon" to --navigation--

Column 9, Line-,51, change "secand" to --second--

Column 9, Line 55, change "claim 5," to --claim 4,--

Column 9, Line 63, change "claim 1," to --claim 7,--

Column 10, Line 7, insert --a-- before "key".

Signed and Sealed this

Fourth Day of September, 2007

JON W. DUDAS
*Director of the United States Patent and Trademark Office*